United States Patent [19]

Sacks

[11] 3,803,357

[45] Apr. 9, 1974

[54] NOISE FILTER

[76] Inventor: Jack Sacks, 815 Tamlei St., Thousand Oaks, Calif. 91360

[22] Filed: June 30, 1971

[21] Appl. No.: 158,519

[52] U.S. Cl. .................................. 179/1 P, 179/1 D

[51] Int. Cl. .............................................. H04r 27/00

[58] Field of Search ........... 325/473, 474, 477, 480; 179/1 P

[56] References Cited

UNITED STATES PATENTS

| | | | |
|---|---|---|---|
| 3,403,224 | 9/1968 | Schroeder | 179/1 P |
| 3,180,936 | 4/1965 | Schroeder | 325/480 |
| R27,202 | 10/1971 | Kahn | 325/477 |
| 3,160,707 | 12/1964 | Meyers | 179/1 P |
| 3,497,812 | 2/1970 | Dixon | 325/480 |

*Primary Examiner*—Kathleen H. Claffy
*Assistant Examiner*—Douglas W. Olms

[57] ABSTRACT

A composite signal having a desired signal content and a noisy signal content is fed to a plurality of contiguous narrow band nonlinear filters connected in parallel. Each filter has a controllable discrimination threshold and together cover the audio spectrum where noise signals are considered objectionable. A noise tracker connected to the same signal source detects the noise level whenever the desired signal is either absent or substantially reduced. The discrimination threshold of each of the narrow band filters is controlled by the output of the noise tracker, which thereby controls the ability of each of the narrow band filters to pass a signal as a function of the noise signal being detected. The outputs of each of the narrow band filters are connected together and fed to a combining circuit where the spectral power in the output of all of said filters is combined in the power phase relationship. The gain of the individual narrow band filters is reduced in the presence of noise. In the presence of a strong desired signal the gain is not attenuated and in this manner the signal to noise ratio of the signal is improved.

10 Claims, 9 Drawing Figures

NOISE FILTER

This invention relates to a process and means for substantially removing wide band noise contained in the same audio spectrum as the desired signal.

In the recording art as practiced today, great use is made of the dubbing procedure where an individual channel is first recorded and then subsequent channels are added to the first channel which thereby enhances the sound and allows the recording engineer and artist great liberty and flexibility in enhancing the sound. Unfortunately, each time a new channel is added to a prior sound track, broad band noise together with the desired signal is also added to the channel. In many situations where the noise level is high, the broad band noise contained in the individual signals can be tolerated and is not unduly offensive. However, there are many situations especially in quiet passages and in soft renditions where the broad band noise is extremely harsh and can be heard by the individual listener. Efforts to remove this broad band noise have not been successful until this invention.

This same problem exists in the movie industry where the dubbing technique is also used since background audio information is usually recorded on site and then placed on the film track at a later time. The action items are then recorded and at still a later time the actual voices of the actors and actresses are added to the already complicated sound track. It must be recognized that the addition of each new sound track adds with it a component of broad band noise from that particular track which generally has the effect of reducing the signal to noise ratio of the signal.

In the present invention there is described a completely adaptive system which receives the composite signal comprising the desired signal and the noisy component signal. The basic circuitry comprises a plurality of contiguous nonlinear narrow band filters, each made responsive to the amount of noise being detected. In the presence of a noisy signal, the output will be diminished whereby in the presence of a strong desired signal the output is unchanged and the signal will pass undistrubed, thereby effectively controlling the signal to noise ratio of the output signal. It has been recognized that generally the noisy component is not contained in all of the audio spectrum but rather is contained in selected mid-range portions of the audio spectrum. For example, the low frequency spectrum generally contains a substantially small component of broad band noise which is not normally considered objectionable. The main noisy signals are usually contained in the so-called mid-range and it is here where the majority of the noisy signals are accounted for and must be removed. Above the mid-range frequencies to the end of the audio range the noisy signals do not generally cause a problem.

In the preferred embodiment the signal source is fed to a plurality of contiguous nonlinear narrow band filters connected in parallel with each other. Each of the narrow band filters is arranged to have a controllable discrimination threshold.

A noise tracker connected to the signal source detects the noise level in the circuit when the desired signal is either present or very low.

The output of the noise tracker continuously controls the discrimination threshold and hence the gain of each of the narrow band filters in response to the noise being detected. In this manner each of the narrow band filters is made to discriminate the signal passing through its filter based upon the presence of noise contained in the signal source. In other words, in the presence of a noisy signal the discrimination threshold of each of the narrow band filters is made larger so as to discriminate against and prevent the transmission of the noisy signal by reducing the gain. However in the presence of a strong output signal, the discrimination circuits have less effect and hence each of the narrow band filters is free to pass this complete and strong composite signal. The output of each of the narrow band filters is fed to a summing amplifier which combines the spectral power in the output of each of the narrow band nonlinear filters.

In the preferred embodiment it will not be necessary to construct a plurality of narrow band nonlinear filters from the lowest audio frequency to the highest audio frequency desired. Experimental evidence indicates that broad band noise is not a significant problem in the lower frequencies nor in the higher frequencies due to psychoacoustical hearing limitations. In the preferred embodiment therefore a single, low-pass filter covering the band of spectral frequencies from the lowest frequency to a mid-range frequency where noise is a problem may be used. The low-pass filter is connected to the signal source in parallel with the plurality of narrow band nonlinear filters which cover the mid-range frequencies where noise is a significant problem. A high-pass filter is connected to the signal source and in parallel with the low-pass filter and the plurality of narrow band nonlinear filters will pass the higher frequencies where noise is generally not considered a problem. The output of all of the defined filters is connected to a summing amplifier where the spectral content in the output of each of the filters is combined in the proper phase relationship. The actual cross over points of the low-pass filter and the high-pass filter will be the function of the equipment used and the severity of the noise and, of course, the spectral content of the noisy signals encountered.

For the worst situation the complete audio band may be broken up by means of a plurality of contiguous narrow band nonlinear filters. However, the process of combining and controlling the discimination threshold of each of the narrow band filters would be the same as mentioned before.

Further objects and advanrages of the present invention will be made more apparent by referring now to the drawings which describe the preferred embodiment and an alternate embodiment. Reference now being made to the accompanying drawings wherein.

Figure 1:
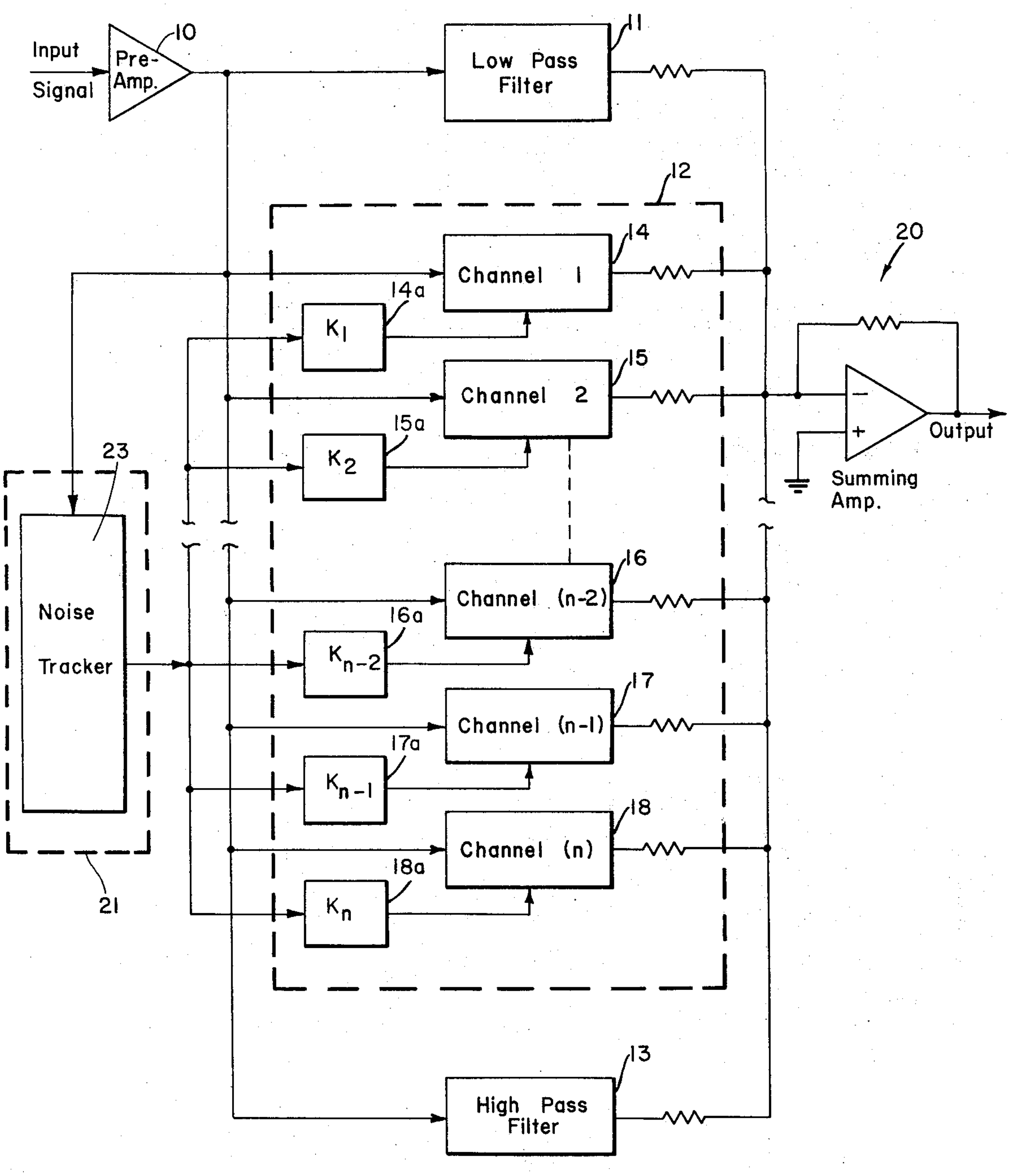
FIG. 1 is a block diagram of the preferred embodiment for this invention.

Referring now to FIG. 1: there shown a preferred embodiment of the present invention. The input signal is generally a composite signal comprising the desired signal as well as a noisy component which is generally considered undesirable. This input signal is fed to a preamplifier 10 which has the effect of bringing both the desired signal and the noisy signal to an acceptable level for processing. The output of the preamplifier 10 feeds a low-pass filter 11, a noise filter 12 and a high-pass filter 13 which are all connected in parallel. The low-pass filter 11 passes the low audio frequencies from the lowest frequency desired to an intermediate frequency. The noise filter 12 comprises a plurality of contiguous narrow band nonlinear channels 14, 15, 16, 17 and 18 which are all connected in parallel. The number of individual channels will be function of the severity and frequency location of the undesirable noisy signals. As mentioned previously, if the signal is particularly noisy and covers an extremely broad band from the lowest frequency to the highest audio frequency desired, then the complete audio system will consist of a plurality of contiguous individual narrow band nonlinear channels.

For the general application of the present invention, the number of individual channels will cover only the mid-range frequencies where the noise is generally considered excessive and must be controlled. Frequency response of the high-pass filter 13 will cover those higher frequencies above the highest frequency of channel 18 and up to the highest audio frequency desired where noise is generally not considered a problem.

The output of all of the filter, namely low-pass filter 11, and all of the individual narrow band channels 14, 15, 16, 17 and 18, and the high-pass filter 13, are connected together and fed to a common summing amplifier 20, where the spectral content located in the output of each of the filters is combined.

Also connected to the output of the preamplifier 10, is a noise tracker 21. The noise tracker 21 generates a signal in response to the noise level whenever the desired signal is at a minimum or is substantially absent. The output of the noise tracker 21, will therefore be a controlled signal that is a direct function of the noise contained in the composite incoming signal. The output control signal from the logic circuitry 23, is used to control the discrimination threshold of each of the individual narrow band nonlinear channels 14 through 18. The output from the noise tracker 23, is actually fed through a separate weighting network 14*a*, 15*a*, 16*a*, 17*a* and 18*a* associated with each of the individual channels 14 through 18, in order to compensate for known variations in the noise spectrum.

In operation the presence of the noisy signal will be detected by the noise tracker 21 which will generate an output signal that will control the discrimination threshold for each of the individual narrow band nonlinear channels 14 through 18. In the presence of a noisy signal as detected by the noise tracker 21, the individual threshold will be changed thereby reducing the gain of the individual channels. In the presence of a strong desired signal, the individual channels will be unaffected and in this way, the signal to noise ratio of the complete output signal will be effected and changed.

Figure 2:
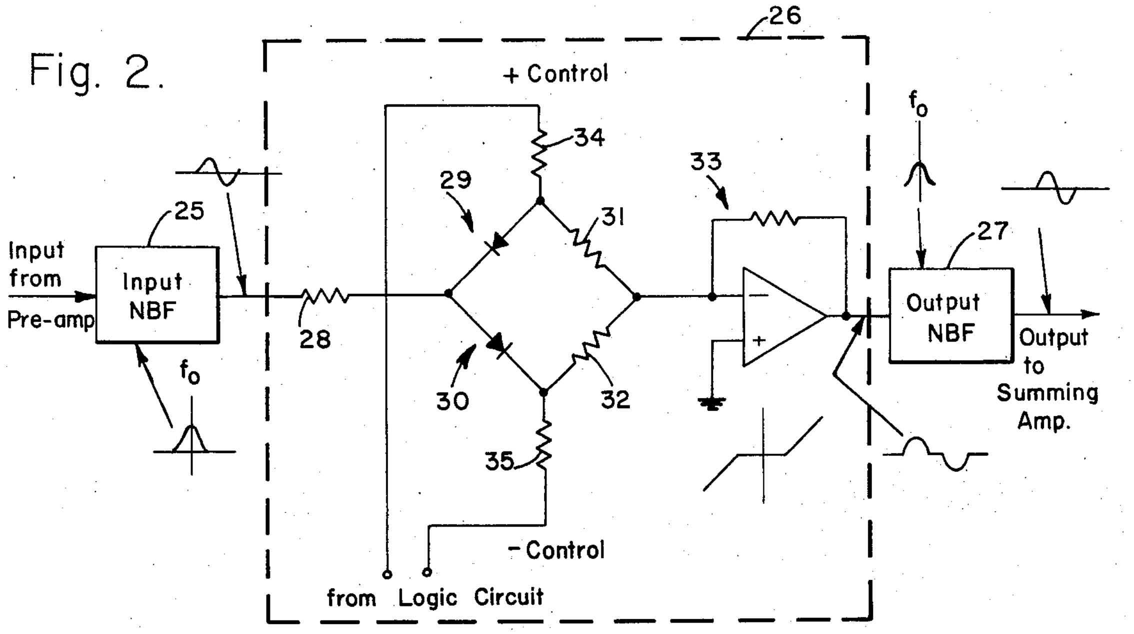
FIG. 2 is a schematic diagram illustrating a first embodiment of the nonlinear narrow band filter having a discrimination threshold circuit.

Referring now to FIG. 2 there is shown a schematic diagram illustrating a first embodiment of the nonlinear narrow band filter illustrated in FIG. 1 as elements 14 through 18. As mentioned before, each of the channels are identical in circuit form and each channel consists of a nonlinear narrow band filter having a discrimination threshold circuit. A review of FIG. 2 will show that the individual channel is composed of three basic parts, namely an input narrow band filter 25, feeding a nonlinear threshold device 26, which in turn feeds an output narrow band filter 27. The input to the narrow band filter 25, is from the pre-amplifier 10 illustrated in FIG. 1, whereas the output from the output narrow band filter 27, is to the summing amplifier 20, in FIG. 1.

The input narrow band filter 25, and the output narrow band filter 27 have substantially identical transfer characteristics which approximates that of an intermediate Q (for example, 2 – 6) tuned circuit. The effect of the input narrow band filter 25, is to reduce intermodulation distortion since the Q attenuation characteristic of the narrow band filter substantially prevents other signals from passing through the narrow pass band of the filter. Intermodulation between the noise signals and the desired signals will produce cross modulation in the nonlinear threshold device 26. These frequencies will be outside the band of the filter 25 and will be strongly attenuated. On the other hand, any signals substantially close to the desired signal which is within the band pass characteristics of the filter 25 will produce sum and difference frequencies outside of the band pass characteristics of the filter 27 and hence, they too will be strongly attenuated.

In the presence of a strong desired signal, any undesired noisy signal passing through the filter 25 with the desired signal will be completely masked. This masking effect takes place in the presence of a substantially strong complex sound signal which as a broad band noise component. The effect is sometimes called a psycho-acoustical masking property of the ear in hearing a large complex sound and this invention takes advantage of the propensity of the human ear and brain to reduce the effect of any broad band noise component in the presence of a strong complex sound signal. However, should the noisy signal be strong and the desired signal weak, and both at substantially the same frequency so as to be passed by the band pass characteristics of the input narrow band filter 25, then there will be no masking effect and the wide band noise will come through to the nonlinear threshold device 26. It can be shown that a complex broad band signal will mask out a broad band noisy component and also that a narrow band desired signal will mask out a spectrally similar narrow band noisy component signal. The most adverse situation however, is the presence of a narrow band signal with a broad band noisy component since in this situation, there is no masking effect and the broad band noise will come through.

The controllable nonlinear threshold device 26, has a band pass characteristic in which the output signal is controlled by varying the dead zone or the threshold in response to the presence of noise as determined by the noise tracker 21 in FIG. 1. In the presence of a noise signal as detected by the noise tracker, the output of the nonlinear threshold device 26, is controlled to widen the dead zone symmetrically about the center frequency and in this way reduces the gain of the signal fed to the output narrow band filter 27. The output of the noise tracker 21 illustrated in FIG. 1, therefore controls the dead zone of the nonlinear threshold device as a function of the noise content of the incoming signal. Since the envelope of the incoming signal is symmetrically affected, the overall band pass characteristic of the complete channel is therefore a function of the band pass characteristic of the input narrow band filter 25, and the output narrow band filter 27.

For simplicity of explanation, we have assumed that the band pass characteristics of the narrow band filter 25, and the narrow band filter 27, have been identical. This is not a requirement since in the preferred embodiment it may be more desired to cascade the band pass circuits so as to obtain a broader or staggered tune effect and in this way increase the band pass characteristics of the individual channel. Where staggered tuning is desired, it is obvious that the band pass characteristics of the input narrow band filter and the output narrow band filter may not be the same. As mentioned previously, the input narrow band filter 25 attenuates frequencies away from the center frequency. In other words the probability of widely separate frequencies inter-modulating and passing through the filter 25 is reduced since frequencies away from the center frequency will be attenuated and prevented from passing through the filter. When considering two frequencies so very close together that they enter the input narrow band filter 25, the sum frequencies will be higher than the band pass characteristics of the output narrow band filter 27, and hence, will not be passed by the individual channel in question. Similarly, the difference frequencies will be so low that they in turn will not pass through the band pass characteristics of the output narrow band filter 27. Hence, it can be shown that the combination of the input narrow band filter 25, and the output narrow band filter 27, substantially reduce the probability of intermodulation distortion taking place.

The output narrow band filter 27 performs the function of cleaning up all irregularities in the signal due to the presence of the dead zone in the nonlinear transfer device 26. As mentioned previously the noise tracker 21, in FIG. 1, controls the dead zone variation of the nonlinear threshold device 26 about the center frequency and in this manner the output signal is symmetrical about the center frequency even though some center portion is removed. It can be shown from a Fourier analysis that any essentially symmetrical signal is composed mainly of odd harmonics with very few evens. The lowest odd harmonic having a substantial energy content is the third harmonic and hence, the output narrow band filter 27, is designed to have a band pass characteristic that highly attenuates the third harmonic, thereby getting rid of any harmonic distortion that may have been introduced in the nonlinear threshold device 26, by the action of opening the dead zone. Higher odd harmonics are even more severely attenuated.

The width of the dead zone and the total number of individual channels used in any system becomes a function of the total amount of noise that the designer is willing to allow to pass through the system. It can be shown mathematically that the noise power is proportional to band width and that increasing the total number of channels has the effect of decreasing the band width per channel, and as a result the noise per channel will also decrease. From a theoretical point of view, it is possible to decrease the noise per channel to zero as a limiting factor by increasing the number of channels to infinity. The important practical consideration however, is that by increasing the number of channels it is possible to significantly reduce the noise power in every channel since the band width of each channel is reduced. It must be remembered however, that the signal is not affected since the signal will come through the channel at full amplitude. Hence, by using a plurality of individual channels, the dead zone (and thus the residual distortion) in each channel can be reduced in proportion to the number of channels used. Where noise is a less severe problem, fewer channels may be required. In a system where noise is a major problem, more channels must be used. In order to remove as little as possible of the desired signal it is important to keep the gap as small as possible and to this extent, use the maximum number of channels consistent with economic requirements. This invention therefore gives the circuit designer a wide latitude in adapting the invention to the economic requirements of the system as a trade-off against the amount of noise that he can tolerate in any given system.

The action of the non linear threshold device 26 therefore is to remove a small slice of the signal at the zero crossing where it can be shown that most of the noise signal is located. The circuit can be described as a zero crossing limiter. The circuit therefore becomes an effective way of eliminating and removing noise from a signal. It will be recognized, however, that a strong noisy signal can come through the system if the strong noisy signal is at or near the frequency of the desired signal. As mentioned previously, the noisy signal will then look like another incoming signal which will then be masked by the larger desired signal by the psycho-acoustic masking effect.

The nonlinear threshold device 26, in the simplest sense, comprises a pair of controllable biased diodes in a bridge feeding an operational amplifier. The output from the narrow band filter 25, is fed through a coupling resistor 28, to the juction of a pair of biases diodes 29 and 30. The diode 29, is connected in series with a resistor 31, and diode 30 is connected in series with a resistor 32, which resistors are joined together and feed the input of amplifier 33. A positive bias control signal is fed through resistor 34 to the junction of diode 29, and resistor 31. In a similar manner, a negative bias control signal is fed through a resistor 35, to the junction of diode 30, and resistor 32.

In the presence of any bias voltage the input signal feeding the bridge circuit must overcome the approximate 0.7 volt drop in each of the diodes 29 and 30. In other words, the bridge circuit consisting of diodes 29, 30 and resistors 31 and 32 will effectively prevent the passage of any signal that does not have a swing greater than 1.4 volt since diodes 29 and 30 cannot conduct until the 0.7 volt breakdown point is reached for each diode. In the absence of a bias signal the bridge circuit will provide a fixed 1.4 volt dead zone. By using suitable positive and negative bias controls feeding the intermediate points of the bridge circuit, the actual dead zone can be made smaller or larger depending upon the sense and the magnitude of the bias currents fed to the bridge circuit.

Figure 4:
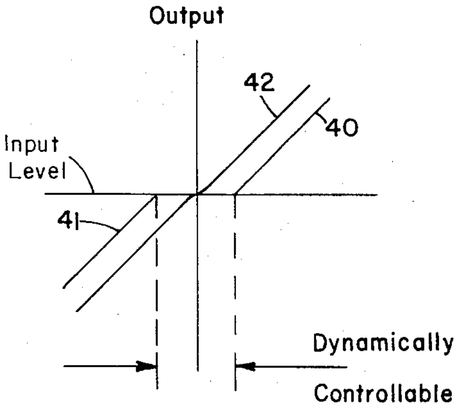
FIG. 4 is a wave form illustrating the action of the narrow band filter having a controllable threshold portion.

It will be obvious to those skilled in the art that a fixed 1.4 volt dead zone is highly excessive when considering maximum voltage swings of 20 volts peak to peak for the input driving signal. In addition, it is most desirable to have the dead zone dynamically controlled by the output of the noise tracker 21 in FIG. 1, to thereby make the complete system adaptive to the amount of noise being detected. A reference to FIG. 4 will more fully illustrate the dynamically controlled dead zone and the linear symmetrical amplification achieved by the nonlinear threshold device 26. The system described and illustrated in FIG. 2 will allow a dynamically controlled dead zone to approach 0.1 or 0.2 volts. However, in order to obtain the full benefits of the present invention it is necessary that a more precise control be obtained over the dead zone. The limitation of 0.1 or 0.2 volt dead zone according to the system illustrated in FIG. 2 is a result of the presently available diodes 29 and 30. A review again of FIG. 4 will show that as the dead zone becomes smaller and smaller the symmetrical linear portions of the curve 40 and 41, will approach the zero crossing and begin to appear as a single linear curve 42, thereby nullifying the effect of the invention which requires precise control over the dead zone.

Figure 3:
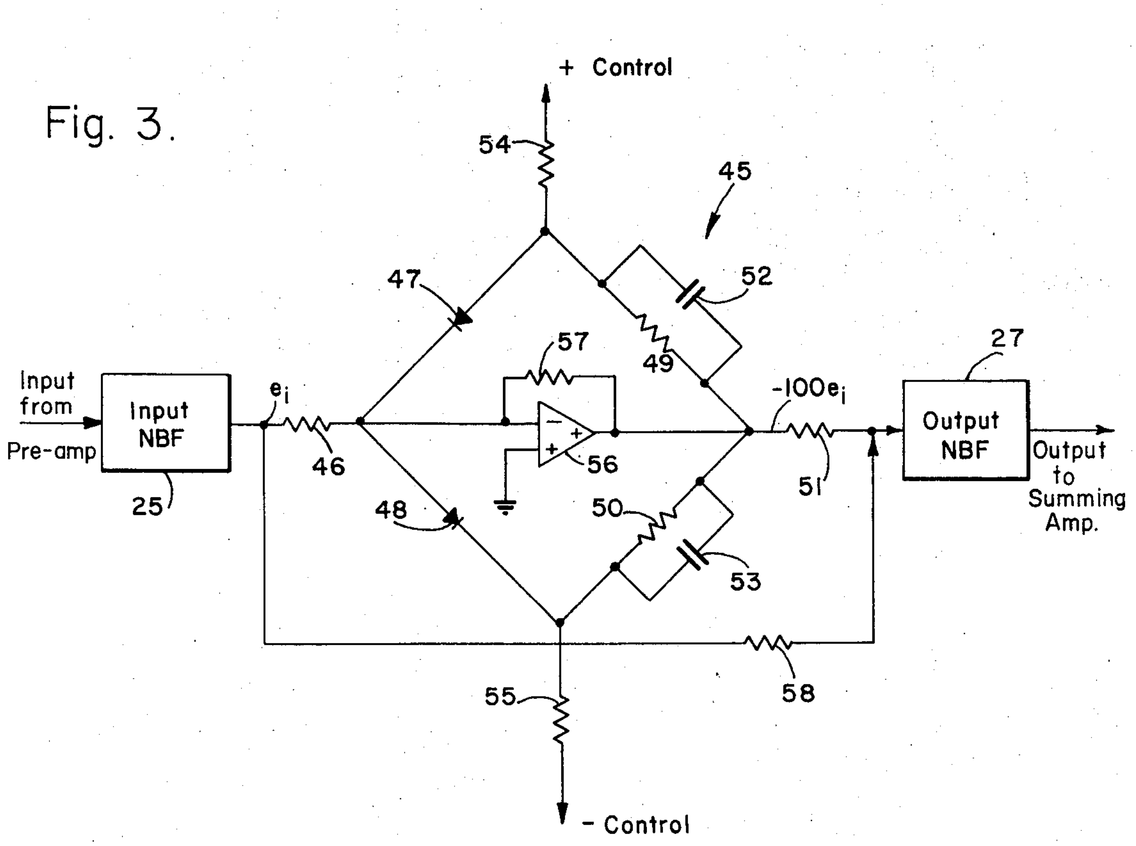
FIG. 3 is a schematic diagram illustrating a second embodiment of the narrow band filter illustrating a preferred embodiment for determining and controlling the threshold of each of the narrow band filters.

Referring now to FIG. 3 there is shown a second embodiment of the nonlinear threshold device which overcomes the inherent disadvantage of the biased diodes mentioned in connection with FIG. 2. The system described and illustrated in FIG. 3 will allow a dynamic controllable threshold device approaching two or three milivolts which now provides the greater control needed to more fully achieve the benefits of the present invention. FIG. 3 illustrates a complete individual channel consisting of an input narrow band filter 25, feeding a new and improved nonlinear threshold device, which in turn feeds an output narrow band filter 27, as described in connection with FIG. 2. The output of the narrow band filter 25, feeds resistor 46, which directs the input signal to a bridge circuit and specifically to the junction of diodes 47 and 48. Diode 47 is connected series with resistor 49, and similarly, diode 48 is connected in series with resistor 50. Resistors 49 and 50 are joined together to thereby define the bridge circuit. The output of the bridge circuit is fed to a resistor 51, which feeds the output narrow band filter 27. A by-pass coupling capacitor 52 is connected across resistor 49, and similarly, a by-pass decoupling capacitor 53 is connected across resistor 50.

A positive bias control is fed through a resistor 54, to the junction of diode 47, and resistor 49, and similarly a negative bias control is fed through a resistor 55, to the junction of diode 48, and resistor 50. An integrated circuit/operational amplifier 56, (op-amp), has the negative gain achieved input connected to the junction of diodes 47, 48 and resistor 46. The output of the amplifier 56, is connected to the junction of resistors 49, 50 and 51. A feed back resistor 57, is connected from the output of the amplifier 56, to the negative input (inverting) side of the amplifier. The output of the narrow band filter 25 is fed through a resistor 58, to the input of narrow band filter 27.

The parameters of the circuit are chosen so that amplifier 56, is operated at high gain and such as 100 (40 d b). The actual amplification of the input signal by amplifier 56, will be according to the ratio of resistors 57 and 46. In other words, the gain achieved by amplifier 56, will be equal to minus R 57 over R 46. The amount of signal fed to the input of filter 27 is controlled by selecting the ratio of resistors 51 and 58 to be the same as the ratio of resistors 57 to 46. In other words, the ratio of resistors 51 to 58 is the same as resistors 57 to resistor 46. The DC current in the bridge circuit is balanced by making resistor 54 and resistor 55 in the bias control system equal. Similarly, resistor 49 and resistor 50 in the bridge circuit are made substantially equal. In the preferred embodiment the ratio of resistor 57 to resistor 46 was selected to give a gain of approximately 100, or in other words, resistor 57 was 100 times the resistance of resistor 46, which results in a gain of 100. Since the ratio of resistors 51 to 58 was made the same as the ratio of resistors 57 to resistor 46 it follows therefore that the resistance of resistor 51 is 100 times the resistance of resistor 58.

If we consider a signal from input narrow band filter 25, to be ei than with the parameters chosen, the output signal from amplifier 56 at the junction of resistors 49 and 50 will be −100 ei. The signal feeding the filter 27 will consist of the output from ei the bridge circuit and the ratio of the input signal ei fed through resistors 58 and 51.

The first signal will be R58/(R51 + R58) −100 ei + R51/(R51 + R58). Remembering that the original condition of the circuit was set up with the ratio of resistors 57 to 46 being equal to 100 and further that the ratio of resistors 51 to 58 was made the same as the ratio of resistors 57 to 46 we can show that the circuit will balance and the output signal will be zero.

With the circuit balanced as shown we have now proved that for low level signals below the slipping level that there will be zero output from the nonlinear threshold device 45. In other words, for noise signals below the level at which the diodes 47 and 48 operate, there will be no output from the circuit. This means that we now have available a low level threshold control of approximately one one-hundredth of the signal necessary to cause the diodes 47 and 48 to conduct. The benefits achieved by the system illustrated in FIG. 3 can now be more fully appreciated over the system described in connection with FIG. 2. The system of FIG. 2 was limited to the voltages at which the diodes would conduct and according to the present date technology these diodes can be controlled by suitable biasing control to conduct to within tenths of a volt. By using the circuit described in FIG. 3 it is now possible to get selective biasing control to within one one-hundredth of the voltages at which the diodes will conduct.

Figure 5:
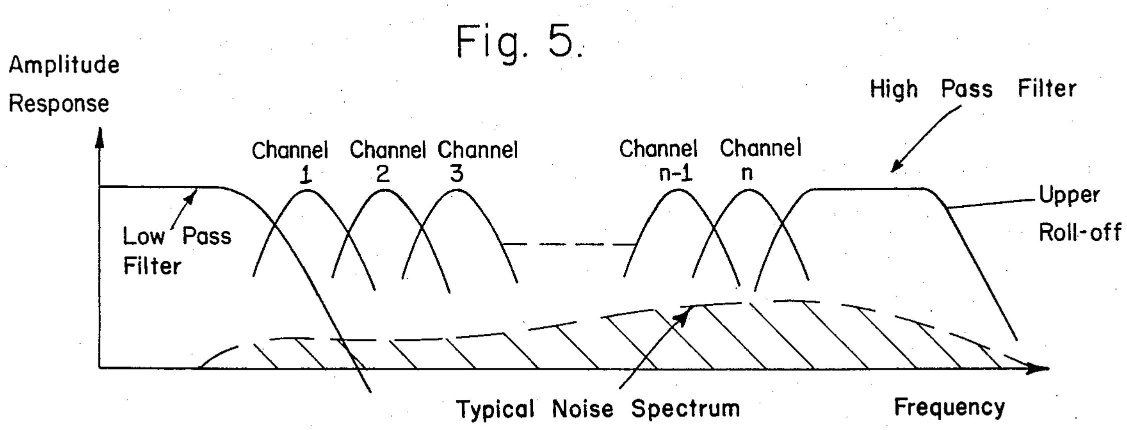
FIG. 5 is a wave form illustrating a composite noise spectrum showing the effect of the low-pass filter, the narrow band filters and the high-pass filter and their relationship to the desired signal and the broad band signal.

Referring now to FIG. 5 there shown a curve illustrating a typical noise spectrum covering the low level signals where noise is generally not a problem. Noise is considered a problem in the mid channels whereas noise is less audible at the higher and lower frequencies. The band pass frequencies of the low-pass filter, the individual channels comprising the noise filter, and the high-pass filter are more graphically illustrated to show the relationship between all filters covering the complete audio spectrum.

Figure 6:
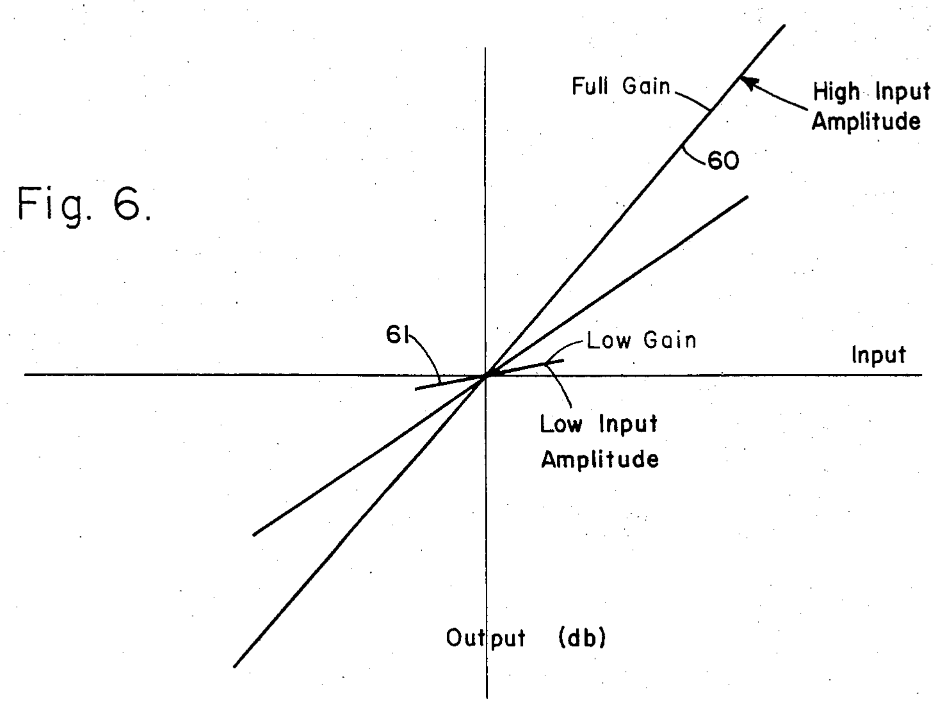
FIG. 6 is an input-output transfer characteristic illustrating the output of the narrow band filters in response to changing conditions of noise and the effect of the noise on the controllable threshold and hence the ultimate effect on the output of the individual filter.

Referring now to FIG. 6 there is shown a graph illustrating the amplitude characteristic of an individual noise filter channel at a point after the output of the second narrow band filter. The curve shows that in the presence of a strong input signal (of high amplitude) a very small slice, will be removed from the input signal and hence, nearly all of the signal amplitude in the individual channel will be available. Curve 60 shows a high input amplitude with very little attenuation of the individual channel. In the presence of a low input amplitude signal which has a noisy component the operation of the individual channel will be to limit the amplitude of the signal passing through that particular channel since a larger dead zone will be present and hence, less amplification of the signal will be available. This effect is shown by Curve 61 which illustrates a low input amplitude signal. The effect of the noise filter is very similar to that of an expander and compressor circuit with the advantage however, that a controlling DC signal is not necessary since the level of the input signal itself dynamically controls the gain of the individual channel.

Figure 7:
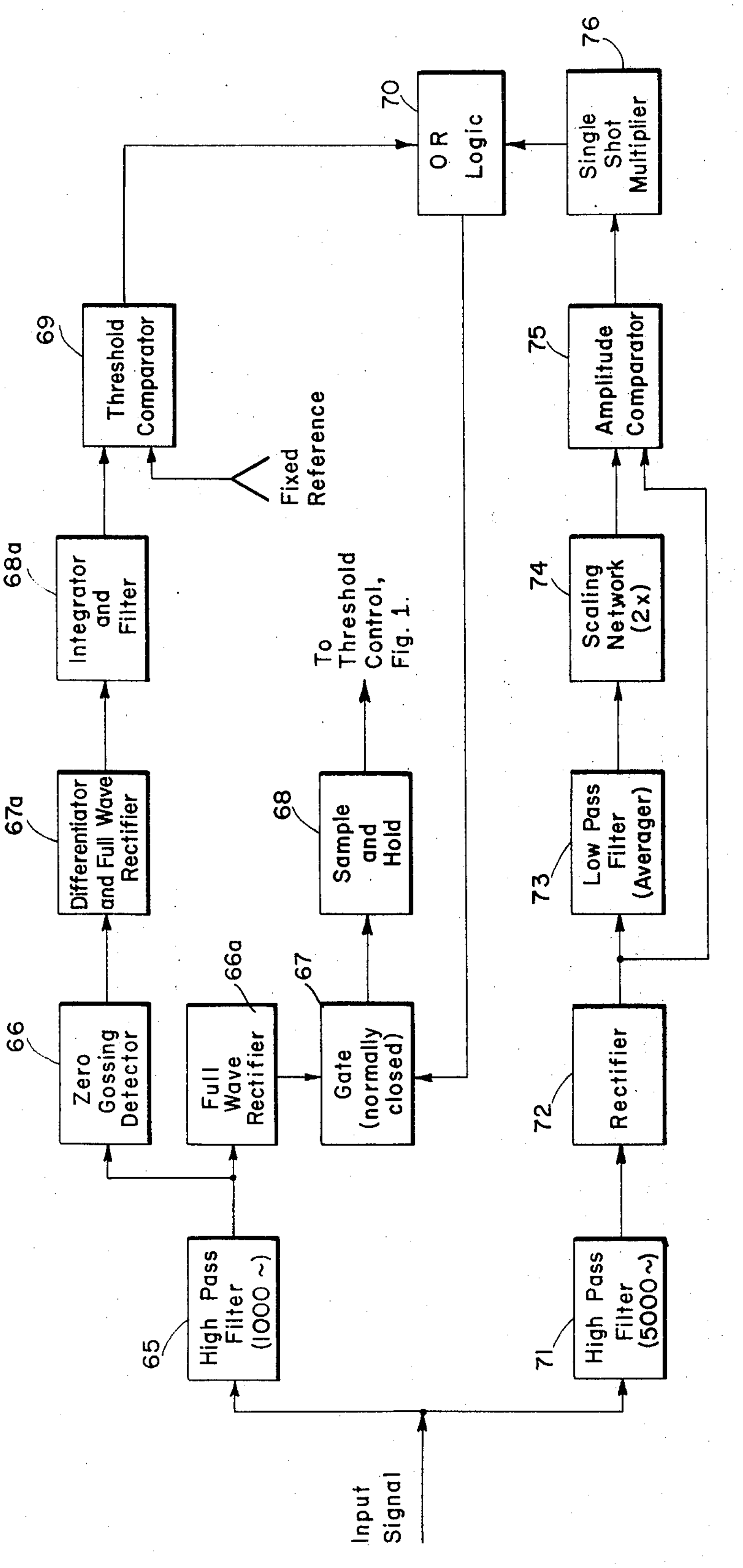
FIG. 7 is block diagram of the preferred noise tracker used in FIG. 1.

Referring now to FIG. 7 there is shown a preferred embodiment of the noise tracker illustrated in connection with FIG. 1. In order to appreciate the significance of how the noise tracker operates, it is best at this time to consider a composite signal containing a desired signal and a noisy component. A review of the spectral content of most musical instruments will show a substantially strong fundamental wave plus even and odd harmonics that attenuate as the frequency increases. This is generally true except as regards some percussive instruments. Since the main power of most desired signals is in the fundamental frequency we can measure the intervals between the zero crossings to detect a predominance of low frequency components of the signal since there is generally more power or amplitude in the lower frequency components than the high frequency components. On the other hand analysis of the zero crossings of a noisy signal will show zero crossings randomly distributed over the frequency range without a falling off as frequency increases as is detected in a musical signal.

The zero crossings of noise will be statistically closer together indicating a generally higher order of frequencies. Remembering that the fundamentals of most musical instruments is relatively low in frequencies and generally below 5,000 Hz., we can now appreciate that musical instruments will therefore have a less random and statistically wider spacing between zero crossings as opposed to the noise signals. Observation of the spectral content of musical instruments have confirmed that the spectral content of musical instruments does generally roll off at the higher frequencies while noise signals remain generally flat and sometimes increase. These observations and a statistical analysis have confirmed the fact that the zero crossings on the average from musical instruments are therefore further apart then zero crossings associated with noise.

A noise tracker, therefore is arranged to generate a signal in proportion to the time between zero crossings as a means of measuring and differentiating a desired musical instrument signal from a noisy signal. The noise tracker illustrated in FIG. 7 feeds the input signal through a high-pass filter to a sample and hold circuit which continuously samples the noise signal. The output of the sample and hold circuit is fed to the individual channels for adjusting the threshold or dead zone of the individual nonlinear circuits. In the presence of a desired musical signal the input to the sample and hold circuit is interrupted and the output held in memory while the noise tracker identifies the incoming signal as desired signal. This hold may last as long as 15 to 30 minutes for long sustained musical passages.

The input to the noise tracker is fed to a first channel which has the function of detecting the presence of a desired signal such as a musical instrument. The first channel comprises a high-pass filter 65, having a cutoff frequency starting at approximately 1,000 cycles in view of the previously discussed reason that audible noise signals will generally appear above the fundamental frequency when dealing with musical instruments. The output of the high-pass filter 65, feeds both a zero crossing detector 66, and full wave rectifier **66*a*, and a normally closed gate 67, which in turn feeds a sample and hold circuit 68. In the normal case, the incoming signal will be identified as noise and will pass the high-pass filter 65 then be rectified in 66*a*, pass through the normally closed gate 67, and feed the sample and hold circuit 68, which in turn will operate to adjust the threshold gate of the nonlinear detectors comprising each of the individual narrow band channels. The system being described will identify the desired signal as either being music or desired sibilant which will have the effect of opening the normally closed gate 67, thereby interrupting the input reading upon the sample and hold circuit 68. In this manner sample and hold circuit 68, will control the threshold by memory until the next reading as determined by the control on the gate 67.**

The zero crossing detector 66, in the present application functions as a hard limiter since it has an extremely high gain but a small dynamic range. In this mode it is possible to obtain a desired output at the time of zero crossing even in the presence of high amplitude signals. The output of the zero crossing detector 66, will actually be a square wave having a repetition rate depending upon the rate of zero crossings detected. The output of the zero crossing detector is fed to a differentiator and a full wave rectifier 67a, which produces a plurality of positive going spikes corresponding to the limited or changing square wave generated by the zero crossing detector 66. The output of the differentiator and full wave rectifier **67*a*, is fed to an integrator and filter 67a, that generates a DC voltage having an amplitude depending upon the frequency of the individual spikes feeding the integrator and filter circuit 68*a***.

In circuits of this type the individual spikes will cause a capacitor (which forms part of the integrator and filter circuit **68*a*) to discharge and in this manner the rapidity of the spikes from the differentiator and full wave rectifier circuit 67*a*, will directly affect the magnitude of the DC signal coming from the integrator and filter circuit 68*a*. The DC signal output from the integrator and filter 68*a*, is smoothed and filtered and now represents in magnitude a function of the spacings of the individual zero crossings as detected by the zero crossing detector 66. In other words, the amplitude of the DC signal will be inversely proportional to the spacings of the detected zero crossings. The DC signal is fed to a threshold comparator circuit 69, (which is actually an amplitude comparator) which in effect compares the input DC signal against a fixed reference DC signal. In the presence of a musical signal input the output of the threshold comparator 69, is a function of the level of the amplitude of the fixed reference signal. The level is chosen so that in the presence of a musical signal input an output signal from the threshold comparator 69, will be fed to an OR logic circuit 70, which will open normally closed gate 67, thereby preventing the sample and hold circuit 68**, from identifying the signal as being noise.

The circuit just described therefore has the capability of specifically identifying the presence of a musical signal and opening a gate 67, in the presence of this detected musical signal.

As mentioned previously, there are sibilants andd other signals that look like noise but are in fact desirable signals in the voice range that should be identified as desired signals and should not be discriminated as noise. The second channel of the noise limiter identifies and processes these sibilant sounds.

Since the sibilant signals are statistically and spectrally similar to the noisy and undesirable signals, it is not possible to discriminate against these sounds by ;means of the zero crossing technique mentioned above for the first channel. It is known, however, that sibilant information does come through as part of the composite signal as a rapid increase in amplitude or a burst of signal. In addition, this information is also at a higher frequency usually above 5,000 or 6,000 Hz. The second channel is therefore connected to the same input as before and comprises a high-pass filter 71, which is preferably arranged to pass frequencies above 5,000 cycles. The output of the high-pass filter 71, is first rectified by rectifier 72, and then averaged by means of a low-pass filter 73. If the signal is basically noise it will be statistically constant and the output of the rectifier 72, will therefore be an essentially constant rectified signal. The low-pass filter 73, will smooth the signal and generate a substantially constant DC signal which will have an amplitude representative of the level of the rectified input signal. The time lag of the low-pass filter 73, will be substantially long of the order of a tenth of a second. The output of the low-pass filter 73, is fed to a scaling network 74, which for example will amplify the DC signal by a factor of 2. The output of the scaling network is fed to an amplitude comparator 75, which receives a second signal directly from the output of the rectifier 72.

In operation the output of the scaling network will continuously compare the output of the rectifier 72, so that in the presence of a sibilant or cymbol crash or a large burst of amplitude will be detected by the amplitude comparator as an immediate change between the two inputs. It is true that over a period of time the output of the low-pass filter 73, will rise and approach the output of the rectified signal from rectifier 72. However, because of the differential time lag between the two signals the difference will be immediately detected at thee output of the amplitude comparator 75. The output of the amplitude comparator 75, is fed to a single shot multi-vibrator 76, which immediately generates a signal that is fed to the OR logic gate 70.

The effect therefore is that the presence of a speech sibilant or similar sound is detected by an increase in amplitude and an output signal will be generated from the amplitude comparator 75, which will fire a single shot multi-vibrator 76, that will generate an output signal fed to the OR logic gate 70, which will open gate 7 and again prevent the sample and hold circuit 68, from identifying the signal as noise.

The noise tracker defined and illustrated in FIG. 7 therefore has the capability of identifying and measuring desired musical or voice sibilant signals and identifying these signals as desired signals. In the presence of a desired signal output the sample and hold circuit 68, will continuously sample the incoming signal as noise. The noise tracker system may be thought of as a fail safe system since the desired signal is positively tracked and identified. However, in the event that a noisy burst is identified as a desired signal, the only effect is that the gate 67 is opened and the signal is identified as a desired signal and hence, the signal is not lost but rather is passed through the system. The noise tracker monitors the noise content of the input signal and adapts the threshold or gain of the channels in response to the detected noise. A review of the embodiment of the noise tracker described in connection with FIG. 7 will show that the output of the sample and hold circuit 68, is a signal that is directly proportional to the measured noise. Therefore, in the presence of a noisy signal the output from the sample and hold circuit 68, will be greater and hence, a larger signal will be required to "open up" the individual nonlinear circuits comprising the individual channels as illustrated in connection with FIG. 1.

Figure 8:
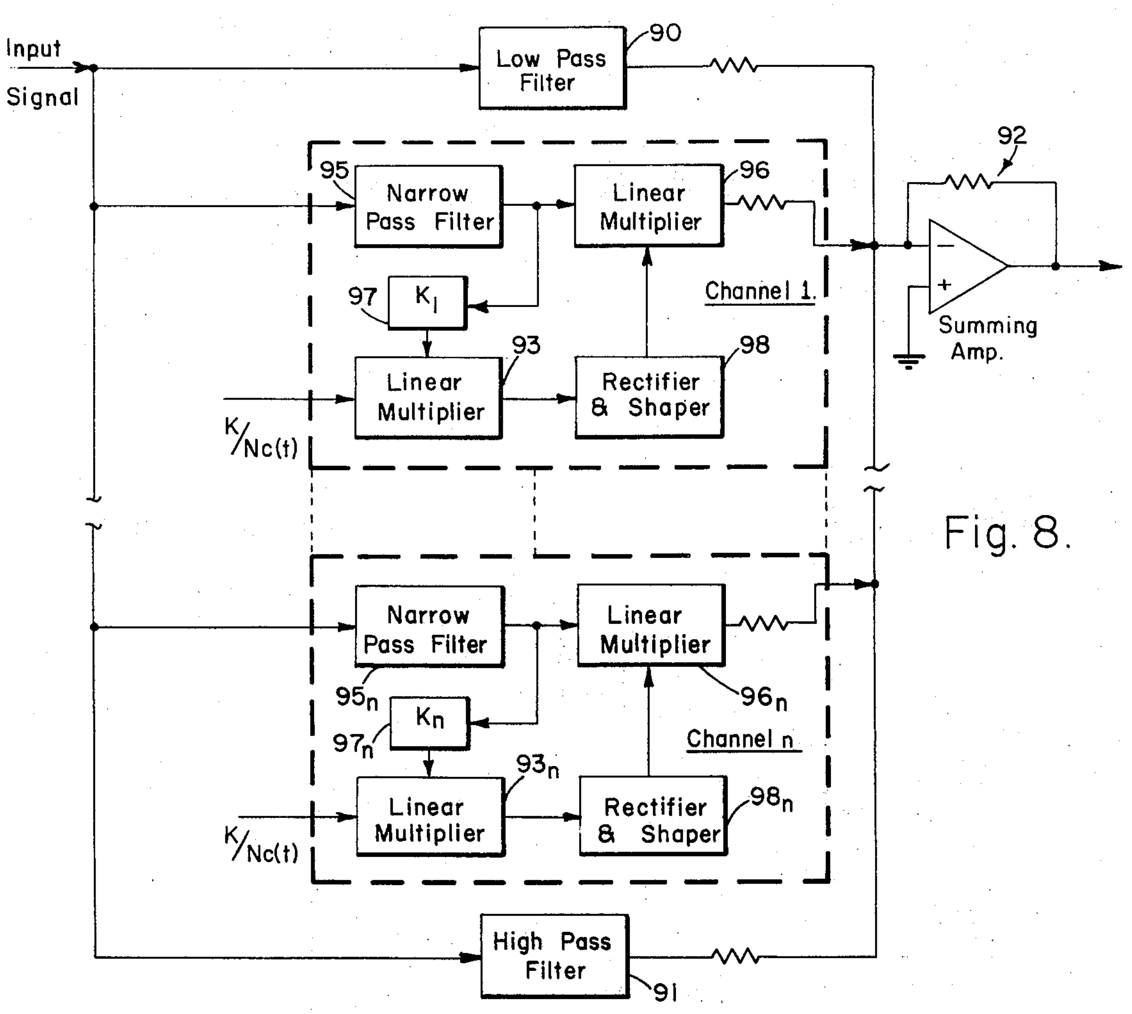
FIG. 8 is a block diagram of a second embodiment of the invention.
Figure 9:
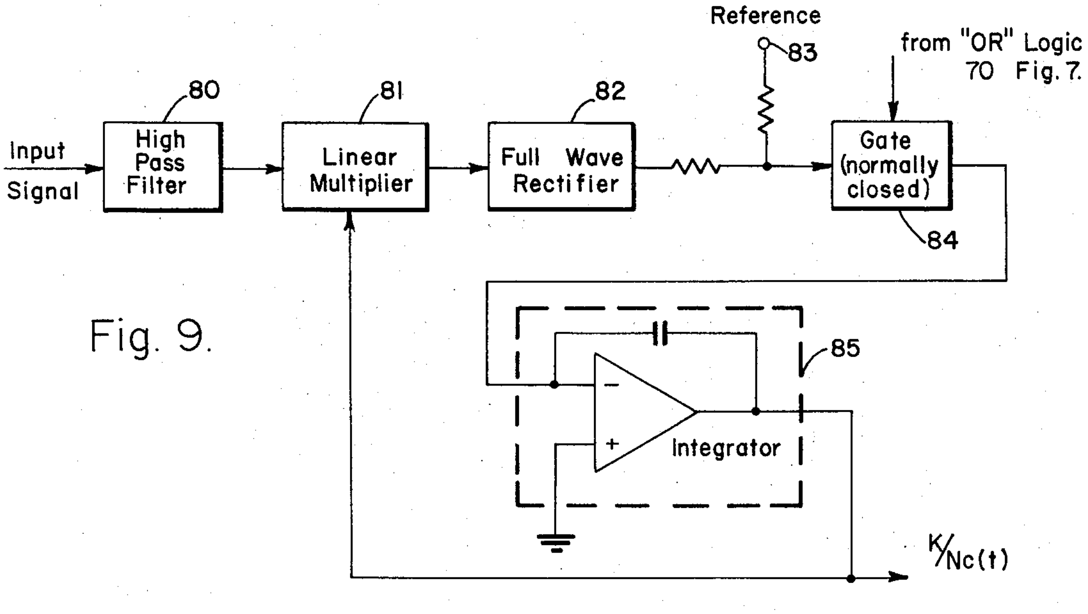
FIG. 9 illustrates an alternate noise tracker for use with the circuit illustrated in FIG. 8.

The second embodiment is more fully illustrated in FIGS. 8 and 9 and operates in a feed forward mode very similar to an automatic gain control circuit. A review of FIG. 7 will show that the output of the sample and hold circuit 68, will be directly proportional to the spectral content of the detected noise signal. Should the sample and hold circuit 68, detect a large level of spectral noise, then an increased signal will be generated which signal will directly increase the threshold dead zone of the associated nonlinear filters. In other words, an increased level of detected noise signal will mean an increased control over the associated nonlinear filters.

In the system to be described in connection with FIGS. 8 and 9, a reciprocal noise signal is generated which signal is fed back to the input of the individual narrow band circuits so as to reduce the input signal gain in proportion to noise in the presence of an incoming signal. Referring now to FIG. 9 there shown a block diagram of a noise tracker which utilizes many of the circuits illustrated in connection with FIG. 7 to generate a signal representative of the reciprocal of the noise signal and referred to as $K/Nc(t)$. The input composite signal contains the desired component $Sc(t)$ and the noisy component $N(t)$ and is fed to a high-pass filter 80, which has a low frequency cutoff of approximately 1,000 Hz. That portion of the composite signal above 1,000 Hz. will pass the high-pass filter 80, and be fed directly into one terminal of a linear multiplier 81. The output of the linear multiplier 81, is fed to a full wave rectifier 82, which generates a DC envelope signal which follows the amplitude of the incoming signal. A reference signal from source 83 is combined with the DC output from the full wave rectifier 82, to produce a difference signal which is fed through a normally closed fast acting gate 84. Gate 84 is controlled by identical circuitry to that illustrated in FIG. 7 which is used to control fast acting gate 67. The operation or control of the gate 84, is such that gate 84 will be held open only in the presence of a desired signal or in the presence of amplitude detected sibilant signals as described in connection with FIG. 7. In other words gate 84 will remain closed in the presence of a noise signal and open in the presence of a desired signal. The output of the gate 84 is fed to an integrator 85, of the type that will maintain a charge on the output due to the action of the high gain amplifier comprising the integrator. The output of the integrator 85, is fed back to the linear multiplier 81, and in that way provides the desired reciprocal noise signal of K/Nc($t$).

The operation of the circuit described in connection with FIG. 9 is more fully understood by considering the following parameters where a desired signal is not detected and hence, there's no output from the OR logic 70 from FIG. 7 to open the gate 84. This condition by definition means that only a noisy signal is coming through and hence, the input signal fed to the high-pass filter 80, will only contain noise previously identified as Nc($t$). The varying noisy signal is fed to the linear multiplier 81, the output of which is rectified to a DC signal by the full wave rectifier 82. The output DC signal is differenced from a reference source 83, which difference signal is a varying DC signal which very closely follows the instantaneous variations of the incoming noisy signal. Since the fast acting gate 84 is closed in the presence of a noisy signal, a difference signal representing the difference between the instantaneous DC signal generated by the full wave rectifier 82, and the reference signal 83, will be fed through the fast acting gate 84, as an error signal or difference signal to the integrator 85. The integrator will of course integrate the error signal and feed the output integrated signal back to the linearmultiplier 81, in the proper phase so as to attempt to reduce the error signal generated by the difference between the full wave rectifier 82, and the reference signal 83, to zero. A review of the mathematics will show with the input signal to the linear multiplier 81, being substantially the noisy signal of N($t$) that any feed back signal generated by the integrator which will null out the error signal generated by the difference between the full wave rectifier 82, and the reference signal 83, must be therefore the reciprocal of the input noise signal or in other words, the feed back signal can be shown mathematically to be K/Nc($t$). The circuit just described in connection with FIG. 9 is part of the noise tracker used in connection with FIG. 8 and is used primarily to generate a reciprocal of the noise signal which is K/Nc($t$ ).

If during the operation of the circuit a desired component of the signal is detected, the fast acting gate 84 will be energized and opened and as a result the integrator 85, will then hold the last level of input voltage before the gate 84 opened the input circuit to the integrator. The memory of the integrator 85, will maintain this signal for a period of time until the next noisy passage as indicated by the closing of the gate 84 at which time the output of the integrator again tracks and attempts to reduce the input to zero by generating the reciprocal of the noisy component signal as described.

The system illustrated in connection with FIG. 7 utilizes the reciprocal component of the noise for reducing the gain of the individual narrow band channels and in this manner acts as an automatic gain control since in the presence of a feed back signal of the reciprocal of the noise component, a greater desired signal is required to obtain the same gain output of the channels.

Referring now to FIG. 8 there is shown a second embodiment of the invention which utilizes a low-pass filter 90, and a high-pass filter 91, which are connected in parallel to the input composite signal consisting of a desired portion S($t$) plus a noisy portion N($t$). The outputs of the low-pass filter 90, and the high-pass filter 91, is fed to a summing amplifier 92, for the same reasons described in connection with the first embodiment. Considering for example channel 1 for a system having n channels, the input signal is fed to a narrow band filter 95, which is tuned to a first frequency and has a band pass characteristic approximating that of a tuned circuit. The frequency response is very similar to that as described in connection with the first embodiment and as illustrated in FIG. 5. The output of the narrow band filter 95, is fed to a linear multiplier 96, however, a portion of the output signal from the narrow band filter is fed to a weighting network 97, then to a linear multiplier 93, and then to a rectifier and shaper 98, which has a fast attack time so that the generated output signal is a DC signal capable of following the envelope variations of the wave form passed by the narrow band filter 95. The DC signal from the rectifier and shaper 98, is fed to the linear multiplier 96, with the effect that in the presence of a large input signal, there is produced a high amplitude DC signal from the rectifier and shaper 98, which tends to increase the gain of the linear multiplier 96, to a maximum gain of unity as shown in connection with FIG. 6 and specifically in Curve 60. The linear multiplier 93, also receives an input of the reciprocal of the noise signal generated from the output of the integrator 85, in FIG. 9. In other words a first input to the linear multiplier 93, will be a composite desired and noisy signal whereas the second input to the linear multiplier will be a DC signal representing the reciprocal of the detected noise signal. The effect of multiplying the DC signal with the composite signal would be to scale the output of the linear multiplier by a factor determined only by the reciprocal of the noise signal. The desired result will be that in the presence of a high level noise, the reciprocal noise signal from integrator 85, will be low and hence, the gain of the individual channels will be low.

It must be remembered that simultaneously with this noise signal from integrator 85 of FIG. 7 will be a large noise composite signal indicated by a large N($t$) passing through the linear multiplier 93 from the narrow pass filter 95.

The weighting network 97, is included to compensate for known variations and acoustical unbalances that can be predicted in advance for each of the individual channels, and for non-uniform noise spectral distributions. The over all effect is that in the presence of a large signal being passed through the narrow band filter 95, there is produced an increased gain from the linear multiplier 96. If thhe increased amplitude of signal is a desired signal namely S($t$), then correspondingly, the noise will be small and hence, the reciprocal of the noise signal from integrator 85, in FIG. 7 which is fed to the linear multiplier 93, in FIG. 8, will be high, thereby increasing the gain of the linear multiplier 93. Similarly, the increased signal passed by the narrow band filter 95, will generate a large DC signal drom rectifier and shaper 98, which also increases the gain of the linear multiplier 96, which is the desired result.

However, if we now consider the presence of a large noisy signal which has an increased gain, then from our prior discussions, we know that the reciprocal of the noise signal, namely K/Nc($t$) from the integrator 85, in FIG. 7, will be low and hence, the gain of the linear multiplier 93, will be decreased as shown by Curve 61 in FIG. 6, which represents a substantially low input amplitude and hence, a low gain output. The effect being that the linear multiplier 93, now has a reduced gain in the presence of a noisy signal. Since the over all amplitude of the signal has been decreased the DC signal generated by the rectifier and shaper 98, will be low and hence, the output of the linear multiplier 96, will also be low. The over all result is that in the presence of a noisy signal the gain of the system for low level signals has been automatically decreased, which is again, the desired result.

The over all effect of the embodiment illustrated in FIG. 8 is exactly the same as that shown in connection with FIG. 1. However, the implementation is different. In discussing noise values in the specifications it must be remembered that we are now dealing with noisy signals that are at least 30 to 40 DB below the maximum signal. The desired signal will therefore always be much larger than the noisy signal even in a noisy recording.

The individual channels are duplicated $n$ times for the $n$ channels that are needed to complete the over all system. The exact number of channels will of course depend upon the severity of the noise problem and the specific bands where the noise predominates. It is envisioned that for a very severe noisy system that the complete band pass may be covered by a plurality of individual channels as just described in connection with channel 1. For the conventional system it is envisioned that a low-pass filter 90, a plurality of individual channels and a high-pass filter 91, will be sufficient. The output of all of the defined low-pass filter narrow band channels and high-pass filter will be fed to a summing amplifier 92, which will combine the spectral outputs in the outputs of each of the defined filters. A review of FIG. 8 will show that there is no need for a second narrow band filter in any of the channels as there was in connection with the first embodiment illustrated in FIG. 1. The reason for this elimination is the absence of a nonlinear element in any of the individual channels as there was in connection with the system illustrated in FIG. 1. It will be remembered that in the first embodiment the second narrow band filter had a band pass characteristic that highly attenuated the third harmonic and thereby preserved the fundamental frequency as it passed through each of the individual channels. In the second embodiment as illustrated in FIG. 8 the nonlinear element in the individual channels has been eliminated and hence, there is no need for the second narrow band filter. The input-output characteristic of the linear multiplier 96, is always a straight line even though the DC signal feeding the multiplier will vary the slope and hence, the gain of the multiplier, but at all times the linear multiplier 96, will be linear. This fact is more properly illustrated in connection with the graph shown in FIG. 6.

Many modifications of the present invention will suggest themselves to those skilled in the art. For example, in the first embodiment, it may be very desirable to limit the signal in the individual channels by including a peak limiter between the two narrow band filters. Placing the limiter between the narrow band filters and in series with the nonlinear element is advantageous because the signal will be limited symmetrically about the center frequency and hence, the second narrow band filter which has its attenuation point of the third harmonic way down on the slope of the band pass characteristic curve will therefore pass a symmetrical or pure sign wave which is actually the fundamental frequency since the input signal will be clipped symmetrically about the center frequency and hence, the distorted component will lie primarily in the amplitude of the third harmonic which the second narrow band filter will substantially suppress.

What is claimed is:

1. In combination, a plurality of contiguous non-linear frequency selective narrow band channels connected in parallel to a signal source, each channel having a continuously controllable amplitude threshold, a noise tracker circuit connected to said signal source for generating a control signal in response to the noise level when a desired signal is substantially absent, means for continuously controlling the amplitude threshold of each of said narrow band channels with said control signal whereby the ability of each narrow band channel to pass a signal is continuously controlled, and means for combining the spectral output of each of said channels in the proper phase relationship.

2. A combination according to claim 1 which includes means for individually weighting the amplitude threshold of each non-linear channel to thereby compensate for known variations in the noise spectrum.

3. A combination according to claim 1 in which each channel comprises a series of circuit having an input narrow band filter, an amplitude controllable threshold non-linear device fed by said input narrow band filter, and an output narrow band filter.

4. A combination according to claim 3 in which the band pass characteristics of said input narrow band filter and the band pass characteristics of said output narrow band filter are substantially equal.

5. A combination according to claim 3 in which said input narrow band filter has a given band pass characteristic and said output narrow band filter has a given band pass characteristic in which the third harmonic and all higher order harmonics of the fundamental frequency passing through the first filter are attenuated by the second filter.

6. A combination according to claim 1 in which the outputs of each of the channels is combined by summing the output of each of the channels.

7. A combination according to claim 3 in which the non-linear device includes a bias controllable diode bridge circuit for removing those signals identified by the noise tracker as noise signals.

8. A low noise audio system comprising, a low pass filter connected to a signal source and adapted to pass a band of audio frequencies in the frequency spectrum where noise signals are not considered objectionable, a plurality of contiguous non-linear narrow band channels connected in parallel to said signal source, each channel having a continuously controllable amplitude threshold, a noise tracker connected to said signal source for generating a control signal in response to the noise level when the desired signal is substantially absent, means for continuously controlling the amplitude threshold of each of said narrow band channels with said control signal whereby the ability of each narrow band channel to pass a signal is continuously controlled a high pass filter connected to said signal source and adapted to pass a band of audio frequencies in the frequency spectrum where noise signals are not considered objectionable, and means for combining the spectral output of each of said channels and said filters in the proper phase relationship.

9. In a system having a niose tracker and a plurality of individual frequency responsive channels the method of controlling the output of a channel in the presence of noise that comprises the steps of;

first detecting and measuring the quantity of noise in a selected frequency spectrum during the absence of a desired signal, and then using the measured value of noise to control the amplitude threshold at which a signal is passed through each of the individual channels.

10. In a system having a noise tracker and a plurality of individual frequency responsive channels a system for improving the signal to noise ratio comprising;

means for detecting and measuring the quantity of noise in a selected frequency spectrum, and means responsive to the measured value of said noise for controlling the amplitude threshold at which a signal is passed through each of the individual channels.

* * * * *